US012288171B1

(12) United States Patent
Karabekova et al.

(10) Patent No.: US 12,288,171 B1
(45) Date of Patent: Apr. 29, 2025

(54) SYSTEMS AND METHODS TO PROVIDE RECORDS FOR NEW USERS OF A COLLABORATION ENVIRONMENT

(71) Applicant: Asana, Inc., San Francisco, CA (US)

(72) Inventors: Aigerim Karabekova, San Francisco, CA (US); Hoaithi Dang, San Francisco, CA (US); Audrey Breitwieser, San Francisco, CA (US); Kevin Zhiyuan Hong, San Francisco, CA (US); Johanna Pajak, Richmond, CA (US); Xi Chen, Seattle, WA (US); Ah Yoon Hwang, New York, NY (US)

(73) Assignee: Asana, Inc., San Francisco, CA (US)

( * ) Notice: Subject to any disclaimer, the term of this patent is extended or adjusted under 35 U.S.C. 154(b) by 192 days.

(21) Appl. No.: 17/867,395

(22) Filed: Jul. 18, 2022

(51) Int. Cl.
  *G06Q 10/00* (2023.01)
  *G06Q 10/0631* (2023.01)
(52) U.S. Cl.
  CPC .............. *G06Q 10/063118* (2013.01)
(58) Field of Classification Search
  CPC .............................. G06Q 10/063118
  See application file for complete search history.

(56) References Cited

U.S. PATENT DOCUMENTS

| | | |
|---|---|---|
| 5,233,687 A | 8/1993 | Henderson, Jr. |
| 5,524,077 A | 6/1996 | Faaland |
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

L. Wu and H. Sahraoui, "Accommodating software development collaboration," 12th Asia-Pacific Software Engineering Conference (APSEC'05), Taipei, Taiwan, 2005, p. 8 pp. -, doi: 10.1109/APSEC.2005.23. (Year: 2005).*

(Continued)

*Primary Examiner* — Matheus Ribeiro Stivaletti
(74) *Attorney, Agent, or Firm* — Esplin & Associates, PC

(57) ABSTRACT

Systems and methods to provide records for new users of a collaboration environment are described herein. Exemplary implementations may: manage environment state information maintaining the collaboration environment; obtain requests to onboard new users to the collaboration environment; obtain subsets of prompts from a set of available prompts; effectuate presentation of a user interface including the subsets of prompts; obtain response information conveying entry and/or selection of answers to individual prompts by the new users; provide one or more of the records for the new users based on the response information; and/or perform other operations.

20 Claims, 3 Drawing Sheets

(56) References Cited

U.S. PATENT DOCUMENTS

| | | |
|---|---|---|
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,139,719 B1 | 11/2006 | Cherneff |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,412,599 B2 | 4/2013 | Saiu |
| 8,499,300 B2 | 7/2013 | Zimberg |
| 8,522,240 B1 | 8/2013 | Merwarth |
| 8,527,287 B1 | 9/2013 | Bhatia |
| 8,527,327 B1 | 9/2013 | Lawrence |
| 8,554,832 B1 | 10/2013 | Moskovitz |
| 8,572,477 B1 | 10/2013 | Moskovitz |
| 8,583,467 B1 | 11/2013 | Morris |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,552,226 B1 | 1/2017 | Norbeck, Jr. |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,282,405 B1 | 5/2019 | Silk |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,585,570 B2 | 3/2020 | Larson |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,621,535 B1* | 4/2020 | Lawrence .......... G06Q 10/1053 |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,121,996 B2 | 9/2021 | Chen |
| 11,138,021 B1 | 10/2021 | Rosenstein |
| 11,140,174 B2 | 10/2021 | Patel |
| 11,151,091 B2 | 10/2021 | Aziz |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0099679 A1 | 7/2002 | Usitalo |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Nobuhiro |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |

(56) References Cited

U.S. PATENT DOCUMENTS

| | | |
|---|---|---|
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0239725 A1 | 10/2007 | Bhat |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155430 A1 | 6/2008 | Prager |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |

(56) References Cited

U.S. PATENT DOCUMENTS

| | | | |
|---|---|---|---|
| 2014/0288987 A1 | 9/2014 | Liu | |
| 2014/0310047 A1 | 10/2014 | De | |
| 2014/0310051 A1 | 10/2014 | Meng | |
| 2014/0350997 A1 | 11/2014 | Holm | |
| 2014/0364987 A1 | 12/2014 | Shikano | |
| 2015/0006448 A1 | 1/2015 | Gupta | |
| 2015/0007058 A1 | 1/2015 | Wooten | |
| 2015/0012324 A1 | 1/2015 | Lance | |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1 | 4/2015 | Rabinovici | |
| 2015/0134393 A1 | 5/2015 | De | |
| 2015/0153906 A1 | 6/2015 | Liao | |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0286990 A1* | 10/2015 | Adair | G06Q 10/1053 |
| | | | 705/319 |
| 2015/0312375 A1 | 10/2015 | Valey | |
| 2015/0317595 A1 | 11/2015 | De | |
| 2015/0339006 A1 | 11/2015 | Chaland | |
| 2015/0363092 A1 | 12/2015 | Morton | |
| 2015/0363733 A1 | 12/2015 | Brown | |
| 2015/0379472 A1 | 12/2015 | Gilmour | |
| 2016/0012368 A1 | 1/2016 | O'Connell | |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1 | 3/2016 | Kass | |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1 | 5/2016 | Figlin | |
| 2016/0147773 A1 | 5/2016 | Smith | |
| 2016/0147846 A1 | 5/2016 | Smith | |
| 2016/0148157 A1 | 5/2016 | Walia | |
| 2016/0180277 A1 | 6/2016 | Skiba | |
| 2016/0180298 A1 | 6/2016 | McClement | |
| 2016/0182311 A1 | 6/2016 | Borna | |
| 2016/0188145 A1 | 6/2016 | Gabor | |
| 2016/0216854 A1 | 7/2016 | Mcclellan | |
| 2016/0224939 A1 | 8/2016 | Chen | |
| 2016/0234391 A1 | 8/2016 | Wolthuis | |
| 2016/0275436 A1 | 9/2016 | Kurjanowicz | |
| 2016/0313934 A1 | 10/2016 | Isherwood | |
| 2016/0328217 A1 | 11/2016 | Hagerty | |
| 2016/0342927 A1 | 11/2016 | Reznik | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0039503 A1 | 2/2017 | Jones | |
| 2017/0061341 A1 | 3/2017 | Haas | |
| 2017/0068933 A1 | 3/2017 | Norton | |
| 2017/0076246 A1 | 3/2017 | Volkov | |
| 2017/0093874 A1 | 3/2017 | Uthe | |
| 2017/0099296 A1 | 4/2017 | Fisher | |
| 2017/0103369 A1 | 4/2017 | Thompson | |
| 2017/0116552 A1 | 4/2017 | Deodhar | |
| 2017/0132200 A1 | 5/2017 | Noland | |
| 2017/0132569 A1* | 5/2017 | Parhi | G06N 20/00 |
| 2017/0140310 A1 | 5/2017 | Gottemukkala | |
| 2017/0147960 A1 | 5/2017 | Jahagirdar | |
| 2017/0153799 A1 | 6/2017 | Hoyer | |
| 2017/0154024 A1 | 6/2017 | Subramanya | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1 | 7/2017 | Deshpande | |
| 2017/0249577 A1 | 8/2017 | Nishikawa | |
| 2017/0316367 A1 | 11/2017 | Candito | |
| 2017/0317898 A1 | 11/2017 | Candito | |
| 2017/0323233 A1 | 11/2017 | Bencke | |
| 2017/0323267 A1 | 11/2017 | Baek | |
| 2017/0323350 A1 | 11/2017 | Laderer | |
| 2017/0344754 A1 | 11/2017 | Kumar | |
| 2017/0346861 A1 | 11/2017 | Pearl | |
| 2017/0351385 A1 | 12/2017 | Ertmann | |
| 2018/0032524 A1 | 2/2018 | Byron | |
| 2018/0052943 A1 | 2/2018 | Hui | |
| 2018/0053127 A1 | 2/2018 | Boileau | |
| 2018/0059910 A1 | 3/2018 | Wooten | |
| 2018/0060785 A1 | 3/2018 | Carnevale | |
| 2018/0060818 A1 | 3/2018 | Yorichika | |
| 2018/0063063 A1 | 3/2018 | Yan | |
| 2018/0068271 A1 | 3/2018 | Abebe | |
| 2018/0075387 A1 | 3/2018 | Kulkarni | |
| 2018/0075413 A1* | 3/2018 | Culver | G06Q 10/067 |
| 2018/0083792 A1 | 3/2018 | Wanderski | |
| 2018/0088754 A1 | 3/2018 | Psenka | |
| 2018/0089625 A1 | 3/2018 | Rosati | |
| 2018/0095938 A1 | 4/2018 | Monte | |
| 2018/0102989 A1 | 4/2018 | Borsutsky | |
| 2018/0131649 A1 | 5/2018 | Ma | |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1 | 7/2018 | Newhouse | |
| 2018/0189736 A1 | 7/2018 | Guo | |
| 2018/0225795 A1 | 8/2018 | Napoli | |
| 2018/0247352 A1 | 8/2018 | Rogers | |
| 2018/0260081 A1 | 9/2018 | Beaudoin | |
| 2018/0262620 A1 | 9/2018 | Wolthuis | |
| 2018/0268338 A1 | 9/2018 | Bussiek | |
| 2018/0285471 A1 | 10/2018 | Hao | |
| 2018/0316636 A1 | 11/2018 | Kamat | |
| 2018/0331842 A1 | 11/2018 | Faulkner | |
| 2018/0341928 A1 | 11/2018 | Khan | |
| 2018/0357049 A1 | 12/2018 | Epstein | |
| 2018/0367477 A1 | 12/2018 | Hariram | |
| 2018/0367483 A1 | 12/2018 | Rodriguez | |
| 2018/0373804 A1 | 12/2018 | Zhang | |
| 2019/0005048 A1 | 1/2019 | Crivello | |
| 2019/0014070 A1 | 1/2019 | Mertvetsov | |
| 2019/0018552 A1 | 1/2019 | Bloy | |
| 2019/0034057 A1 | 1/2019 | Rudchenko | |
| 2019/0068390 A1 | 2/2019 | Gross | |
| 2019/0079909 A1 | 3/2019 | Purandare | |
| 2019/0080289 A1 | 3/2019 | Kreitler | |
| 2019/0095839 A1 | 3/2019 | Yuki | |
| 2019/0095846 A1 | 3/2019 | Gupta | |
| 2019/0102700 A1 | 4/2019 | Babu | |
| 2019/0138583 A1 | 5/2019 | Silk | |
| 2019/0138589 A1 | 5/2019 | Udell | |
| 2019/0138961 A1 | 5/2019 | Santiago | |
| 2019/0139004 A1 | 5/2019 | Vukovic | |
| 2019/0147386 A1 | 5/2019 | Balakrishna | |
| 2019/0187987 A1 | 6/2019 | Fauchère | |
| 2019/0213509 A1 | 7/2019 | Burleson | |
| 2019/0236516 A1 | 8/2019 | Ponnusamy | |
| 2019/0265821 A1 | 8/2019 | Pearl | |
| 2019/0319813 A1* | 10/2019 | Abu-Ghazaleh | G06Q 10/103 |
| 2019/0340296 A1 | 11/2019 | Cunico | |
| 2019/0340574 A1 | 11/2019 | Ekambaram | |
| 2019/0347094 A1 | 11/2019 | Sullivan | |
| 2019/0347126 A1 | 11/2019 | Bhandari | |
| 2019/0370320 A1 | 12/2019 | Kalra | |
| 2020/0019907 A1 | 1/2020 | Notani | |
| 2020/0059539 A1 | 2/2020 | Wang | |
| 2020/0065736 A1 | 2/2020 | Relangi | |
| 2020/0162315 A1 | 5/2020 | Siddiqi | |
| 2020/0192538 A1 | 6/2020 | Karpe | |
| 2020/0192908 A1 | 6/2020 | Smith | |
| 2020/0193556 A1 | 6/2020 | Jin | |
| 2020/0218551 A1 | 7/2020 | Sabo | |
| 2020/0228474 A1 | 7/2020 | Cameron | |
| 2020/0233879 A1 | 7/2020 | Papanicolaou | |
| 2020/0244611 A1 | 7/2020 | Rosenstein | |
| 2020/0328906 A1 | 10/2020 | Raghavan | |
| 2020/0344253 A1 | 10/2020 | Kurup | |
| 2021/0004380 A1 | 1/2021 | Koch | |
| 2021/0004381 A1 | 1/2021 | Smith | |

(56) References Cited

U.S. PATENT DOCUMENTS

| | | | |
|---|---|---|---|
| 2021/0065119 A1 | 3/2021 | Magazine |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |

FOREIGN PATENT DOCUMENTS

| | | | |
|---|---|---|---|
| CN | 102378975 B | 5/2015 |
| WO | 2015036817 A1 | 3/2015 |
| WO | 2015123751 A1 | 8/2015 |
| WO | 2016099586 A1 | 6/2016 |
| WO | 2020006634 A1 | 1/2020 |
| WO | 2022109153 A1 | 5/2022 |

OTHER PUBLICATIONS

"U.S. Appl. No. 14/584,750, Examiner Interview Summary mailed Feb. 25, 2016", 3 pgs.
"U.S. Appl. No. 14/584,750, Non Final Office Action mailed Aug. 28, 2015", 21 pgs.
"U.S. Appl. No. 14/584,750, Notice of Allowance mailed Mar. 28, 2016", 8 pgs.
"U.S. Appl. No. 14/584,750, Response filed Feb. 29, 2015 to Non Final Office Action mailed Aug. 28, 2015", 16 pgs.
"U.S. Appl. No. 14/584,850, Final Office Action mailed Sep. 1, 2017", 31 pgs.
"U.S. Appl. No. 14/584,850, Non Final Office Action mailed Jan. 10, 2017", 9 pgs.
"U.S. Appl. No. 14/584,850, Response filed Apr. 10, 2017 to Non Final Office Action mailed Jan. 10, 2017", 13 pgs.
"How to Asana: Inviting teammates to Asana." YouTube, Asana, Mar. 21, 2017, https://www.youtube.com/watch?v=TLOruY1KyxU ( Year: 2017), 13 pages.
"Rules of Data Conversion from Document to Relational Databases", published: 2014, publisher: Future-processing, pp. 1-8 (Year: 2014).
(Tiburca, Andrew) Best Team Calendar Applications for 2018-Toggl https://toggl.com/blog/best-team-calendar-applications-for-2018 (Year: 2017).
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
Creating Tables with Fields from 2 Different Tables, published: 2009, publisher: StackOverflow, pp. 1-2. (Year: 2009).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/ https://en.wikipedia.org/wiki/Critical_path_method (Year: 2017) 6 pages.
Dawei Li, "Deepcham: Collaborative Edge-Mediated Adaptive Deep Learning for Mobile Object Recognition", 2016, IEEE/ACM, pp. 64-76. (Year: 2016).
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv30 (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020).

(56) References Cited

OTHER PUBLICATIONS

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

Buco, M.J., Chang, R.N., Luan, L.Z., So, E., Tang, C. and Ward, C., Jul. 2005, Pem: A framework enabling continual optimization of workflow process executions based upon business value metrics. In 2005 IEEE International Conference on Services Computing (SCC'05) vol. 1 (vol. 2, pp. 33-40). IEEE. (Year: 2005).

Efficiency aware scheduling techniques in cloud computing: a descriptive literature review; Author: Sana, Muhammad Usman; Li, Zhanli. Publication info: PeerJ Computer Science PeerJ, Inc. (May 4, 2021) (Year: 2021) 37 pages.

\* cited by examiner

SYSTEMS AND METHODS TO PROVIDE RECORDS FOR NEW USERS OF A COLLABORATION ENVIRONMENT

FIELD OF THE DISCLOSURE

The present disclosure relates to configuring a collaboration environment for new users as part of a remote onboarding process, in particular, by specially adapting records of the collaboration environment based on user responses to questions posed in prompts presented on computing platforms of the new users.

BACKGROUND

Web-based collaboration environments, sometimes referred to as work management platforms, may enable users to assign projects, tasks, and/or other work assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. Away that operators look to improve the operation of the collaboration environment is to improve parts of the collaboration environment involving substantial human-machine interaction and/or parts that fall short of providing intuitive experiences for the users. For example, onboarding new users to a collaboration environment traditionally starts with an assumption that all new signups are going to use the collaboration environment for a particular function, e.g., project management and/or some other function. The onboarding experience was therefore tailored to create an experience around that, in a one-size-fits-all model. However, such a model would often require users to answer configuration questions that are not relevant (e.g., not related to features/functionality they may not end up using), provide recommendations around the configuration and functionality of the collaboration environment that simply are not suitable for how they actually intend to use the collaboration environment, and/or otherwise do not allow the configuration of some initial records of the collaboration environment in a meaningful way. There has yet to be a user interface and/or remote onboarding workflow that tailors the onboarding process for new users collaboration environment.

To address these and/or other problems, one or more implementations presented herein propose a technique to provide records for new users of a collaboration environment. A collaboration environment may aim to deliver a holistic work management solution to an entire organization. Therefore, there are many types of new users that sign up. Depending on the user and/or their primary purpose, they may have different expectations within the collaboration environment—from managing their personal to-dos, all the way up to strategic goals. The inventors of the present disclosure propose herein a segmented approach to onboarding new users and generating an improved new user experience. One or more implementations herein may generate an onboarding flow where new users can provide self-identified data to tailor their onboarding experience. This enables the collaboration environment to guide new users to the optimal functional solutions within the collaboration environment and help them realize value quickly.

These, along with other features and/or functionality presented herein, may be recognized by persons of ordinary skill in the art as providing improvements upon the operation of a collaboration environment including, among others, increased efficiency and accuracy in the creation and management of records and/or the information making up the records of the collaboration environment, and/or improvements in the user interfaces of collaboration environments.

One or more implementations of a system configured to provide records for new users of a collaboration environment may include one or more of non-transitory electronic storage, one or more hardware processors configured by machine-readable instructions, and/or other components. Executing the machine-readable instructions may cause the one or more hardware processors to facilitate providing records for new users of a collaboration environment. Providing records may include supplying or making records available to the new users. Providing records may include generating new records and/or modifying existing records. The machine-readable instructions may include one or more computer program components. The one or more computer program components may include one or more of an environment state component, a user interface component, an onboarding component, and/or other components.

The non-transitory electronic storage may be configured to store onboarding information and/or other information. The onboarding information may include a set of available prompts posing questions related to a collaboration environment. The questions related to the collaboration environment may be directed to how users perform work, prioritize work, and/or intend to carry out work within the collaboration environment.

The environment state component may be configured to manage environment state information maintaining the collaboration environment. The collaboration environment may be configured to facilitate interaction by users with the collaboration environment. The environment state information may include one or more records. The records may include one or more of user information describing the users of the collaboration environment, work unit information describing units of work that are managed, created, and/or assigned within the collaboration environment, and/or other information.

The onboarding component may be configured to obtain requests to onboard new users to the collaboration environment. The new users may be onboarded by configuring the collaboration environment. The collaboration environment may be configured based on answers to questions posed in individual prompts presented to the new users in an interface as part of the onboarding process. By way of non-limiting illustration, the requests may include a first request to onboard a first new user and/or other requests.

The onboarding component may be configured to obtain subsets of prompts from the set of available prompts. Obtaining the subsets of prompts may be performed in response to obtaining the requests. Individual ones of the subsets of prompts may correspond to individual roles attributed to the individual ones of the new users. By way of non-limiting illustration, a first subset of prompts may be obtained from the set of available prompts for the first new user based on a first role attributed to the first user.

The user interface component may be configured to effectuate presentation of instances of a user interface of the collaboration environment on computing platforms associated with the new users. The user interface may include the subsets of prompts obtained based on the attributed roles, and/or other information. The new users may provide entry and/or selection of individual answers to the individual prompts in the subsets of prompts within the user interface. By way of non-limiting illustration, the user interface including the first subset of prompts may be presented on a first computing platform associated with the first new user.

The user interface component may be configured to generate response information conveying the entry and/or selection of the answers to the individual prompts by the new users. By way of non-limiting illustration, the response information may include first response information conveying a first set of user entry and/or selection within the user interface at the first computing platform, and/or other information. The first set of user entry and/or selection may convey a first set of answers to the questions posed in the first subset of prompts present to the first new user.

The onboarding component may be configured to obtain the response information.

The onboarding component may be configured to provide one or more records for the new users based on the response information and/or other information. The one or more records provided for the new users may include user information, work unit information, and/or other information that is adapted based on the response information and/or other information. By way of non-limiting illustration, a first record may be provided to the first new user based on the first response information and/or other information. The first record may be provided such that first user information, first work unit information, and/or other information in the first record is adapted based on the first response information and/or other information.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
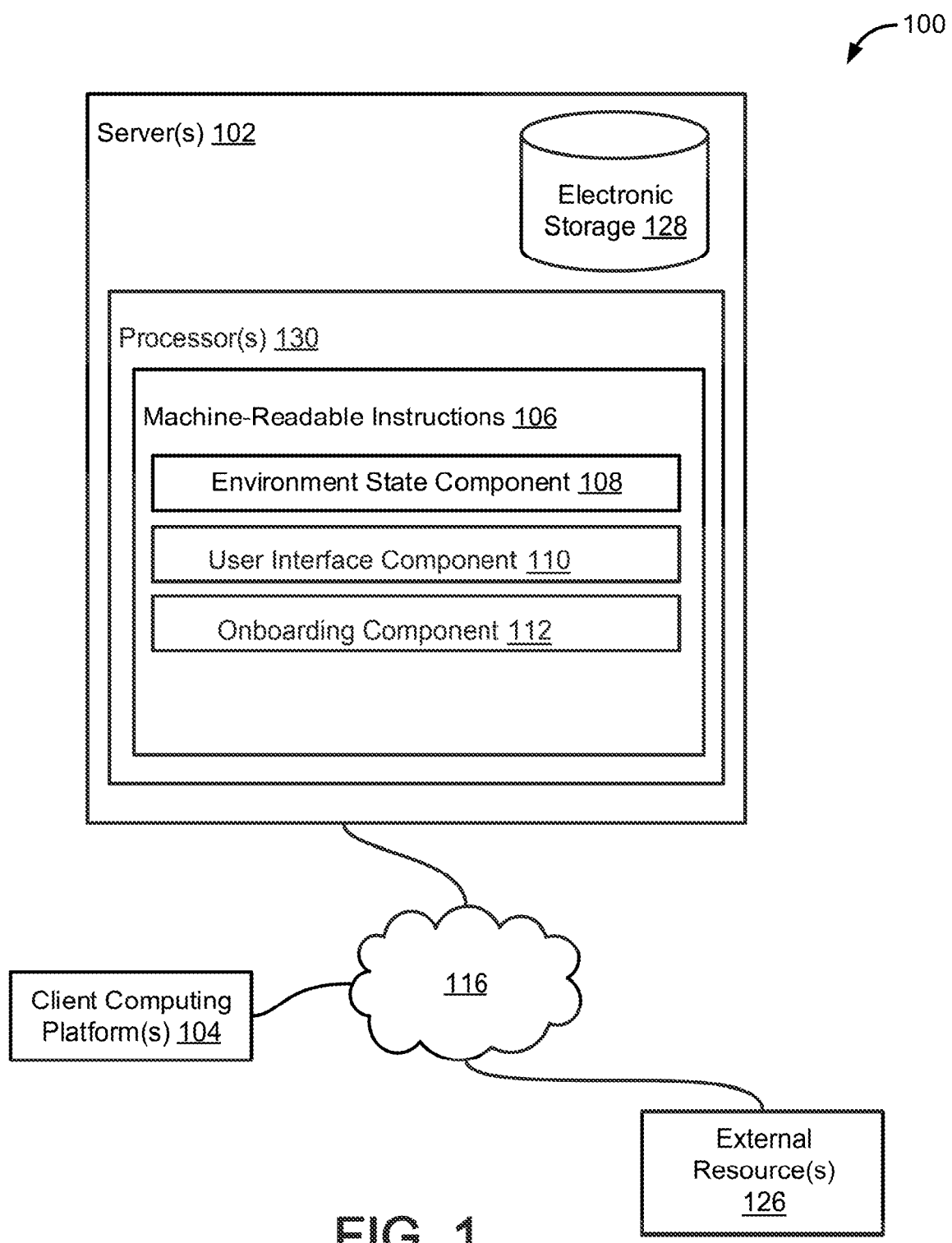
FIG. 1 illustrates a system configured to provide records for new users of a collaboration environment, in accordance with one or more implementations.

FIG. 1 illustrates a system 100 configured to provide records for new users of a collaboration environment, in accordance with one or more implementations. Providing records may include supplying or making records available to the new users. Providing records may include generating new records and/or modifying existing records. The records that are provided may be a result of the new users answering questions posed in prompts presented to the new users. The particular prompts that are presented to individual new users may be tailored to those individual new users. In particular, the tailored prompts may be derived from role(s) attributed to the individual new users and/or other information. These and/or other features may be a departure from traditional one-size-fits-all approaches where all new signups are assumed to be using the collaboration environment for a common purpose and thus would be asked a common set of questions.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate providing records for new users of a collaboration environment. The computer program components may include one or more of an environment state component 108, user interface component 110, an onboarding component 112, and/or other components.

Environment state component 108 may be configured to manage environment state information and/or other information used in maintaining a collaboration environment. The collaboration environment may be configured to facilitate interaction by users with the collaboration environment. The environment state information may include one or more records. The one or more records may include one or more of user records, work unit records, and/or other records. The user records may include user information describing the users of the collaboration environment. New user records may be created as new users signed up (e.g., are onboarded, create user accounts, etc.). The work unit records may include work unit information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., user-name/password for one or more third-party applications), spatial arrangement of work preference(s), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, and/or other units of work.

Units of work may be created by a given user for the given user and/or created by the given user and assigned to one or more other users. Units of work may be created by a given user for the given user and/or created by the given user and managed by one or more other users. Tasks may include to-do items and/or action items one or more users should accomplish and/or plan on accomplishing in order to complete a task. Individual units of work may include and/or may be associated with one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may specify one or more of a unit of work name, a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/ or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports (e.g., is included in) a project and/or objective. The values may specify one or more of a name/title of another work unit record (e.g., project, objective), a name/username of an owner of another work unit record, and/or other information.

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$) by month, by more than one month (e.g., May through July), and/or other calendar views. Units of work may be represented in a calendar view by user interface elements (e.g., icons, calendar entries, etc.). The board view may include a grid of cells comprising columns and rows, where visual content item (e.g., icons) representing work unit records may be positioned in the cells. Columns may be associated with sections (e.g., different hierarchies, groupings, etc.), and the cells within the column may be populated with visual content item representing work unit records that are associated with the sections.

In some implementations, environment state component 108 may be configured to manage information defining work unit pages (sometimes referred to simply as "pages") corresponding to the individual units of work. Individual work unit pages may provide access to individual units of work and/or their records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual units of work.

Users may access work unit records via the work unit pages by viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages. In some implementations, user pages may include views of the collaboration environment that provide access to user records.

In some implementations, work unit records may define projects. The work unit information that defines projects may be referred to as project information and/or other information. Project information may include values of work unit parameters for projects managed within the collaboration environment. The work unit parameters for projects may be referred to as "project parameters." The work unit parameters comprising project parameters may be specific to projects and may include one or more parameters not shared with tasks and/or objectives. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. The work unit information defining objectives may be referred to as objective information. The objective information may include values of one or more work unit parameters that define the objectives. The values of the work unit parameters may be organized in records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objectives may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

The onboarding component 112 may be configured to obtain requests to onboard new users to the collaboration environment. The new users may be onboarded by configuring the collaboration environment. The collaboration environment may be configured based on answers to questions posed individual prompts, and/or other information. For example, questions may be posed, and the answers provided by new users may be used to determine values of one or more parameters. Configuring the collaboration environment may include providing records for the new users and/or other operations. By way of non-limiting illustration, the requests may include a first request to onboard a first new user and/or other requests.

In some implementations, the onboarding component 112 may obtain requests based on one or more of receiving the requests, retrieving the requests, and/or other mechanisms to obtain. In some implementations, obtained requests may be checked against a security protocol to ensure the requests are valid. In some implementations, requests may be generated at individual ones of the client computing platform(s) 104, external resource(s) 126, and/or other sources, and communicated to server(s) 102 over network 116. In some implementations, one or more electronic communications may be sent from individual ones of the client computing platform(s) 104, external resource(s) 126, and/or other sources, and communicated to server(s) 102 over network 116, where server(s) 102 responds to the communications by initializing and/or generating the requests locally. In some implementations, requests may be associated with one or more sources where requests are able to be generated from (see, e.g., discussion of "source of the requests" herein).

The onboarding component 112 may be configured to determine individual roles that are attributed to individual ones of the new users. The onboarding component 112 may be configured to determine the individual roles to be attributed to the individual ones of the new users from one or more of channel information, response information (e.g., answers to role-specific questions posed in prompts—see, e.g., user interface component 110), and/or other information. In some implementations, roles may be determined initially (e.g., prior to determining which prompts to present to the new users), iteratively (e.g., in an ongoing basis in response to individual answers provided in prompts), and/or in other ways.

The onboarding component 112 may be configured to obtain channel information for new users characterizing source of the requests. The channel information may be obtained in response to obtaining the requests and/or in response to other triggers. In some implementations, individual requests may include channel information. In some implementations, channel information may be included as metadata accompanying individual requests. Information characterizing source of requests and included in channel information may include one or more of identification of a source, content of the source, and/or other information.

In some implementations, source of the requests may provide insight as to how the new users arrived at becoming onboarded to the collaboration environment. The information characterizing the source may include meaningful information used to attribute one or more roles to individual ones of the new users. Source may include one or more of an online platform different from the collaboration environment, a specific advertisement, an electronic communication, and/or other sources.

An online platform different from the collaboration environment may include a platform that promotes the collaboration environment, advertises the collaboration environment, and/or is otherwise associated with the collaboration environment. An online platform may include one or more of a social media platform, a professional networking and/or career development platform, a CRM ("customer relationship management") platform, and/or other platforms. An online platform may provide a mechanism to generate and/or send requests to the system 100. By way of non-limiting illustration, an online platform may include a link, virtual button, and/or other content that allows requests to be generated, including collecting channel information, and appending that to a request. For example, a platform may include an ad including words like "Join the collaboration environment now to start managing your work," accompanied by a link that, upon selection, generates a request for the selecting user. The online platform may provide insight into role(s) of a new user by virtue of content on the platform. By way of non-limiting illustration, the online platform may include identifying information, employment-oriented information, and/or other personal information about the new users. For example, a platform may specifically describe a new user's current role in a business, a prior role in the current business, a prior role in a prior business, a level of education, and/or other information. The content of the online platform may provide a direct mapping to role(s) as defined within the system 100. For example, if prior employment information indicated that the new user was a "project manager" a role of "manager" may be attributed to the new user upon receiving the request and channel information.

A specific advertisement may include one or more links or virtual buttons that, upon selection, generate a request. The specific advertisement may include content (e.g., words, graphics, etc.) that may be indicator of role(s). By way of non-limiting illustration, the specific advertisement may include content that is directed at people of specific roles. Therefore, generating a request from the specific advertisement may mean that the person desires to have the role(s) specifically mentioned in the advertisement. The content of the advertisement may be included as channel information. By knowing the content of the advertisement that brought a new user to the collaboration environment, that content may be deemed meaningful in determining what role(s) should be attributed to a new user (at least initially). For example, an advertisement may say "Business owners—click here to join the collaboration environment"; a role of "business owner" may be attributed to the new user upon receiving a request stemming from this advertisement.

An electronic communication may include one or more links or virtual buttons that, upon selection, generate a request. An electronic communication may include content that may be an indicator of role(s). The content that may be an indicator of role(s) may include one or more of text making up the communication, a characterization of a sender of the communication, and/or other information. For example, an electronic communication may include an e-mail sent from an existing user of the collaboration environment to a colleague who may not yet be a user. The sender of the electronic communication may be identified in the communication by, for example, and email address associated with the existing user. The existing user may already have one or more work unit records to manage their work, and/or other records established within the collaboration environment. The records established within the collaboration environment of the existing user may provide insightful information as to the role of the person who received their email. For example, the existing user's records may show that the existing user sent the email to his project manager to onboard them to the collaboration environment. Accordingly, a role of "project manager" may be attributed to the new user upon receiving a request stemming from this electronic communication.

By way of non-limiting illustration, in response to obtaining the first request, onboarding component 112 may be configured to obtain first channel information characterizing a first source of the first request. The first role attributed to the first user may be determined from the first channel information.

In some implementations, a role for a new user may be determined by promoting the new user with role-specific prompts with questions related to role via the user interface. In some implementations, questions related to role may comprise direct and/or indirect questions. A direct question for role may be just that—a question that asks, "what is your role?" The question may be more pointed. For example, a question may be "what is your role in your business as a whole?," accompanied by a text input field where a user can input an answer by typing direction into the text input field. For example, an answer may be "intern." For example, a question may be "what is your role in bookkeeping/accounting?," accompanied by a set of selectable virtual buttons, such as a button for "head accountant," and a button for "assistant," a button for "I do not participate in this role." A question may be "what is your role when it comes to managing employees?," accompanied by a text input field where a user can input an answer by typing direction into the text input field. An answer may be "I am in HR." A question may be "what is your role when it comes to big projects?," accompanied by a drop down menu of check boxes, such as a checkbox for "manager," a checkbox for "collaborator," and a checkbox for "reviewer of final decisions," for example.

The onboarding component 112 may be configured to obtain and/or access a set of available prompts posing questions related to the collaboration environment. Non-transitory electronic storage 128 may be configured to store onboarding information and/or other information. The onboarding information may include the set of available prompts posing questions related to a collaboration environment. In some imps, available questions related to the collaboration environment may be directed to one or more of how users perform work, prioritize work, intend to carry out work within the collaboration environment, and/or other questions. In some imps, available questions related to the collaboration environment may be directed to one or more particular work unit records corresponding to particular action items. Individual questions may be directly or indirectly related to parameters of records, so that answers to the questions will subsequently comprise the values for the parameters themselves, and/or the values may be derived from the answers.

By way of non-limiting illustration, questions may be related to, and/or may specifically comprise, one or more of how a user typically completes work, how a user selects work to work on, when a user prefers to work, what types of work a user prefers to work on, a user's experience, a user's qualifications, a user's expertise, a user's supervisor or superior, other ones of the user's colleagues, importance of certain work and/or types of work, how much a user collaborates with others, the roles of collaborators, and/or other ways that the user performs work, prioritizes work, and/or otherwise intends to carry out work.

Individual questions may be presented in prompts as text strings and/or other content. A prompt may comprise one or more of a dedicated user interface, user interface portion, user interface window (e.g., pop up window), and/or other forms. The prompts may be configured with one or more portions for receiving user input of answers. A portion for receiving user input of an answer may include one or more of a text input field (e.g., text box) where answers may be supplied as freeform text input, a set of check boxes having predetermined answers that users can choose from through selection of a box, a set of user interface elements (e.g., virtual buttons) that may be selected to supply an answer associated with an element, and/or other components.

By way of non-limiting illustration, a question may comprise "when do you prefer to work?" and accompanied by a text input field where a user can input an answer by typing direction into the text input field. For example, an answer may be "during regular business hours only," or "anytime except 2-3 pm because I pick up my kids from school." Such a question may correspond to a date parameter of work unit records, and the answer may, for example, impact the dates and/or times that work unit records may be assigned to them.

By way of non-limiting illustration, a question may comprise "when are you the most productive?" and accompanied by a set of selectable virtual buttons, such as a button for "mornings," a button for "before lunch," a button for "after lunch," a button for "evenings," and a button for "late nights," for example. A user can input an answer by selecting the appropriate button. Such a question may correspond to a notification settings parameter of work unit records, and an answer may, for example, impact the dates and/or times that notifications are able to be sent to the user.

By way of non-limiting illustration, a question may comprise "how do you like to organize your daily tasks?" and accompanied by a drop down menu of check boxes, such as a checkbox for "in a list," a checkbox for "in a calendar view," a checkbox for "in a board view," for example. A user can input an answer by checking the appropriate box. Such a question may correspond to a parameter that characterizes how a user's queue of work unit records may be presented, and an answer may, for example, impact the spatial arrangement of work unit items in a page that shows their queue.

In some implementations, questions directed to one or more particular work unit records may facilitate the creation of the one or more particular work unit records and/or modification of the one or more particular work unit records in order for the particular items of work/action items to be made available within the collaboration environment. A question may include a direct question about whether certain work needs to be completed and by what date. By way of non-limiting illustration, a question may be "Do you want to set up an intake call with human resources today?" An answer of "yes" may cause creation of a work unit record for a unit of work with a title that says, "have call with HR," assigned to the new user, and dated for that day. In some implementations, an answer of "no" may cause a prompt to appear which asks the user which day they want to have the call. Based on a subsequent entry and/or selection of a particular day, a work unit record for a unit of work may be created with a title that says, "have call with HR," assigned to the new user, and dated for the selected day. In some implementations, an answer of "yes" may cause an existing work unit record for a unit of work with a title that says "have call with new employee" to be assigned to the HR manager and dated for that day.

In some implementations, the questions may be predetermined, modifiable, non-modifiable, and/or configured in other ways.

It is noted that the descriptions of questions related to the collaboration environment are provided for illustrative purposes only and not to be considered limiting. Instead, those skilled in the art may appreciate other ways to word and/or configure questions posed in prompts in order to obtain answers that dictate values for one or more parameters of one or more records.

The onboarding component 112 may be configured to obtain subsets of prompts from the set of available prompts. Obtaining the subsets of prompts may be performed in response to one or more of obtaining the requests, obtaining channel information, determining individual roles, and/or other triggers. Individual ones of the subsets of prompts may correspond to individual roles that have been attributed to the new users. The subsets of prompts that are obtained based on the attributed roles may include questions that pertain to those individual attributed roles. A mapping between individual roles and individual subsets of prompts having requisite questions may be set by an administrator of the system 100. By way of non-limiting illustration, a first subset of prompts from the set of available prompts may be associated with a first role and/or other roles, a second subset of prompts from the set of available prompts may be associated with a second role and/or other roles, etc. In some implementations, individual subsets may include an exclusive of prompts having questions not appearing in other individual subsets. In some implementations, multiple ones of the subsets may include one or more similar prompts posing one or more similar questions as other individual subsets.

By way of non-limiting illustration, a question asking for when a user is most productive may correspond to an owner role, manager role, supervisor role, accountant, associate role, employee role, and/or other roles but not to intern role, temp role, and/or other roles, as interns and/or temps may already have limited windows of working hours anyway. By way of non-limiting illustration, a question related to management style may correspond to a manager role, but not to an assistant role.

It is noted that the descriptions of mappings between roles and questions in prompts are provided for illustrative purposes only and not to be considered limiting. Instead, those skilled in the art may appreciate that administrators of the system 100 may decide how they want these mappings to look, and what questions would be pertinent to what role(s).

By way of non-limiting illustration, a first subset of prompts may be obtained from the set of available prompts for the first new user based on a first role attributed to the first user.

The user interface component 110 may be configured to effectuate presentation of instances of a user interface of the collaboration environment on client computing platform(s) 104 of the user. The user interface may provide one or more views of the collaboration environment and/or provide other features and/or functionality. The one or more views may include one or more pages of the collaboration environment, individual prompts posing one or more questions, and/or other views. In some implementations, an individual view of the collaboration environment may textually and/or graphically display information from one or more of a user record, a work unit record, and/or other information. By way of non-limiting illustration, a view may display one or more of a work unit page, a queue of units of work, one or more prompts for onboarding, and/or other information.

In some implementations, user interface component 110 may be configured to effectuate presentation of instances of a user interface of the collaboration environment through which prompts are presented for new users during onboarding. A prompt may be presented as one or more of a user interface window, pop-up, user interface portion, and/or other display configured to present textual information, graphic elements, user interface elements, and/or other elements.

The user interface may include one or more user interface portions. The user interface may include one or more user interface elements configured to facilitate user interaction with the user interface. By way of non-limiting illustration, user interface elements may include one or more of text input fields, drop-down menus, check boxes, display windows, virtual buttons, icons, graphics, and/or other elements configured to facilitate user interaction.

The user interface may be configured to receive user input comprising entry into the user interface and/or selection of elements displayed in the user interface.

A user interface of the collaboration environment through which prompts are presented for new users during onboarding may comprise a landing page dedicated for the onboarding process and/or other view of the collaboration environment. The new users may provide entry and/or selection of individual answers to the individual prompts in the subsets of prompts within the user interface. By way of non-limiting illustration, the user interface including the first subset of prompts may be presented on a first computing platform associated with the first new user.

The user interface component 110 may be configured to obtain and/or generate response information conveying the entry and/or selection of the answers to the individual prompts by the new users. The response information may be stored in non-transitory electronic storage 128 and/or other storage locations. In some implementations, interactions at the client computing platforms 104 comprising the entry and/or selection of the answers to the individual prompts may be communicated to user interface component 110 such that user interface component 110 may generate the response information. In some implementations, individual client computing platforms may generate the response information based on the user entry and/or selection and communicate the response information to the user interface component 110.

By way of non-limiting illustration, the response information may include first response information conveying a first set of user entry and/or selection within the user interface at the first computing platform by the first user, and/or other information. The first set of user entry and/or selection may convey a first set of answers to the questions posed in the first subset of prompts presented to the first new user.

The onboarding component 112 may be configured to obtain the response information and/or other information. The onboarding component 112 may be configured to provide one or more records to individual ones of the new users based on the response information and/or other information. The one or more of the records provided for the new users may include one or more of user information, work unit information, and/or other information that may be adapted based on the response information and/or other information. As described herein, individual questions may be directly or indirectly related to parameters of records, so that answers to the questions may subsequently comprise the values for the parameters themselves, and/or the values may be derived from the answers. Accordingly, adapting the user information, the work unit information, and/or other information based on the response information may comprise varying the values of one or more parameters based on the individual answers.

In some implementations, providing the one or more of the records may include one or more of creating individual new records, modifying individual existing records, and/or other provisions of records.

By way of non-limiting illustration, a first record may be provided to the first new user based on the first response information and/or other information. The first record may be provided such that one or more of first user information, first work unit information, and/or other information in the first record is adapted based on the first response information and/or other information.

In some implementations, providing the first record may include creating the first record (e.g., the first record is created as a new record). By way of non-limiting illustration, the first record may include a new user record created for the first new user.

In some implementations, providing the first record may include modifying the first record. That is, the first record may include a record already stored by the system 100 prior to the first request. By way of non-limiting illustration, the environment state component 108 may be configured to modify the first record based on the first response information and/or other information.

In some implementations, modifications to individual existing records may include one or more assigning the individual existing records to the individual ones of the new users, adding the individual ones of the new users as collaborators on the individual existing records, adding the individual ones of the new users as reviewers of the individual existing records, and/or other modifications that may be effectuated by varying a value of a parameter of the record and/or other information used to manage the collaboration environment.

The onboarding component 112 may be configured to modify the individual roles attributed to the new users. Modification of the roles may include changing one or more roles attributed to the new users. The modification of the roles may be performed based on response information and/or other information. The modification of the roles may be performed during the process of presenting prompts and/or obtaining the response information. By way of non-limiting illustration, after obtaining an answer(s) from a question (or set of questions), a role may be determined based on the answer(s); after obtaining subsequent answer(s) from a subsequent question (or set of subsequent questions), the role may be modified based on the subsequent answer(s); etc. Accordingly, the attributed roles may be "dynamic," meaning they may change and adapt as more information about a user is acquired through the user's answers.

Further, since attributed role(s) may be changed in an ongoing, iterative nature, so may the prompts which are presented to the users. Accordingly, onboarding component 112 may be configured to modify, in response to modification of individual roles, one or more prompts in the subsets of prompts that were previously selected and presented based on previously attributed role(s). Modifying the one or more prompts may include one or more of adding questions to individual prompts, removing requesting from individual prompts, changing words used in individual questions of individual prompts, and/or other modifications. The modification(s) may cause the current questions in current prompts and/or subsequent questions presented in subsequent prompts to be more tailored to the updated role(s) of the users.

The presentation of prompts may continue until there is enough information about the new users, and/or provision of records, to sufficiently onboard them to the collaboration environment. In some implementations, this may include a predetermined number of prompts, answers, and/or other factors. Thus, one or more implementations of the system 100 achieve a departure from traditional one-size-fits-all approaches, by providing a dynamic role attribution, which causes changes in the user interface, and elicits answers to provide at least an initial set of records and/or collaboration environment configurations that are pertinent to each users intended or planned use of the collaboration environment.

Figure 3:
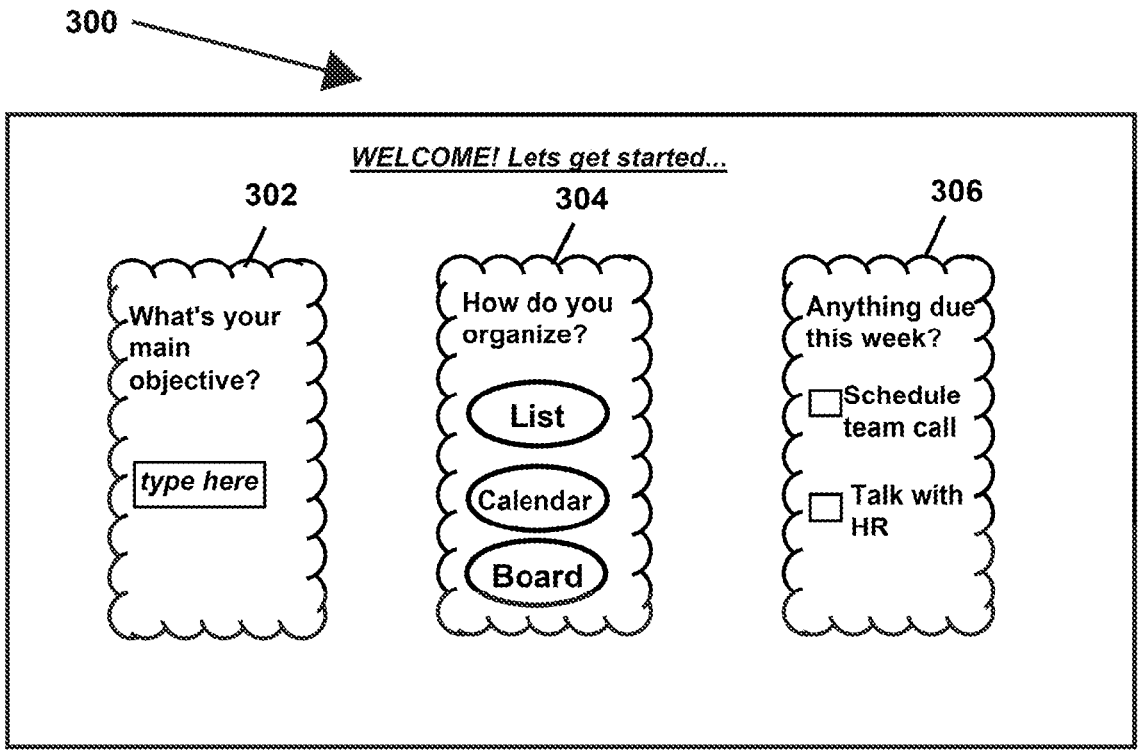
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may comprise a set of prompts used to configure the collaboration environment for a new user (which itself may be a subset obtained from a set of available prompts). The user interface 300 may be presented in response to receiving a request to onboard a new user. The prompts in the user interface 300 may be associated with a role attributed to the new user, in accordance with one or more implementations presented herein. Individual prompts may pose one or more questions. By way of non-limiting illustration, a first prompt 302 may pose a first question about the user's intent in the collaboration environment. The first prompt 302 may include a text input field and/or other user interface elements through which a new user provides answer. By way of non-limiting illustration, a second prompt 304 may pose a second question about how the new user likes their visual content items for work to be arranged. The second prompt 304 may include a set of selectable virtual buttons which correspond to different answers. By way of non-limiting illustration, a third prompt 306 may pose a third question about particular action items that need to be created and/or completed soon. The third prompt 306 may include a set of check boxes that correspond to different action items. One or more records may be provided to the new user based on responses to the questions in the prompts.

Figure 4:
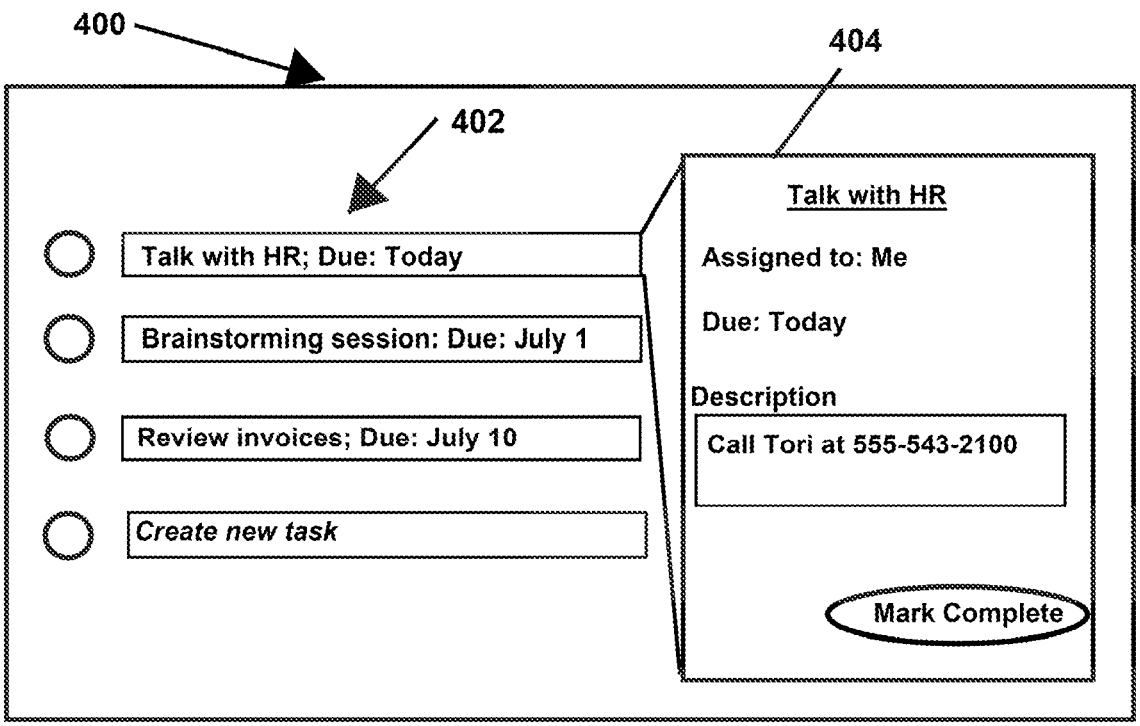
FIG. 4 illustrates a user interface, in accordance with one or more implementations.

FIG. 4 illustrates a user interface 400 of a collaboration environment, in accordance with one or more implementations. The user interface 400 may include a view of a collaboration environment. In particular, the user interface 400 may comprise a view of the collaboration environment that has been configured based on answers to questions by a new users (e.g., FIG. 3). The user interface 400 shows a queue 402 of units of work for the new user, a work unit page 404 for one of the units of work, and/or other content. The queue 402 may show units of work in a list based on a user's answer to the question in second prompt 304 of FIG. 3 being the selection of the virtual button for "list." The work unit page 404 may comprise a page for a work unit record created in response to the user's answer the question in the third prompt 306 of FIG. 3 comprising a selection of the check box for "Talk with HR."

FIGS. 3 and 4 are provided for illustrative purposes only and are not to be considered limiting. Instead, those skilled in the art may recognize other prompts and/or questions that may result in other records being provided, and reflecting in one or more views of the collaboration environment.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
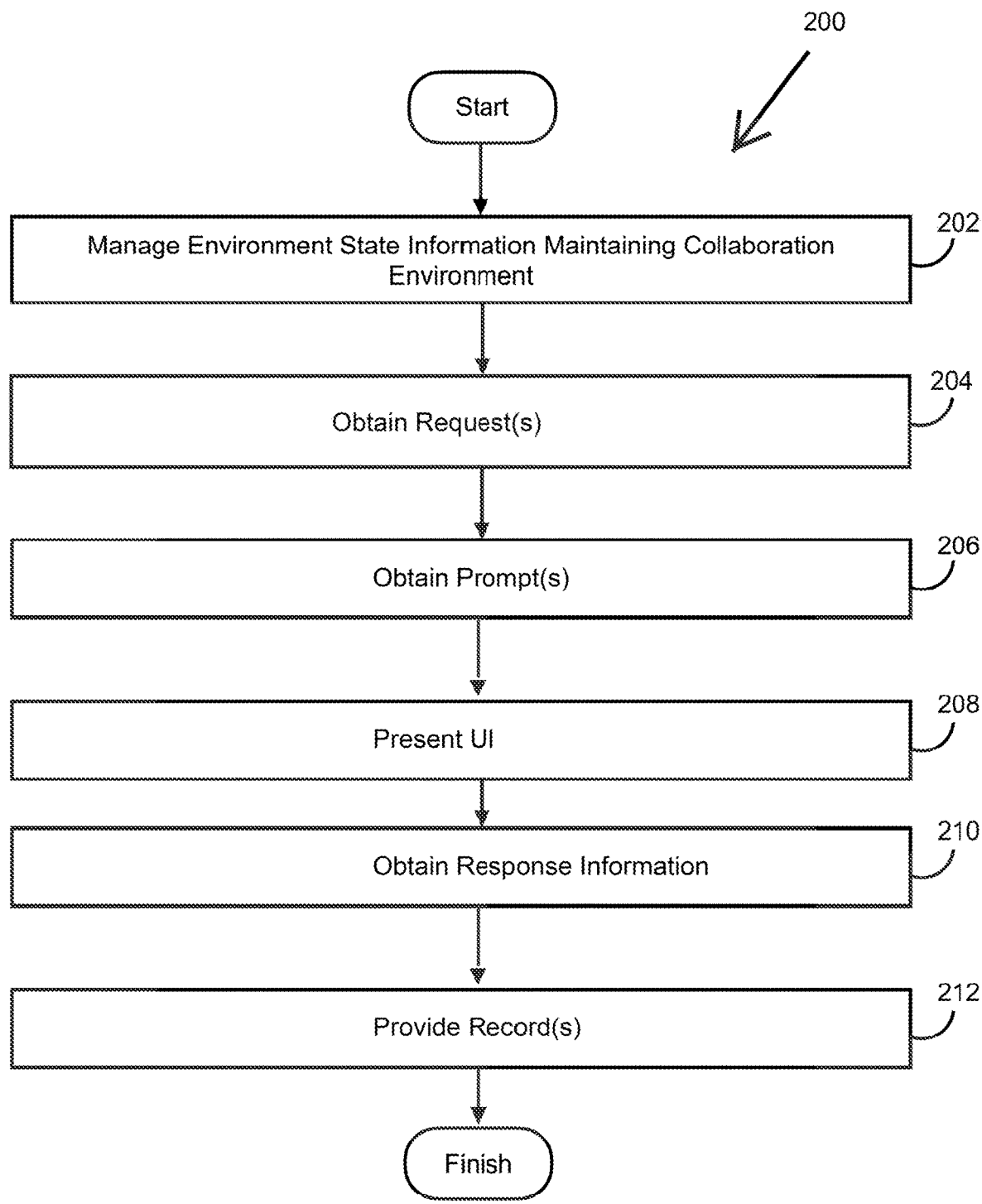
FIG. 2 illustrates a method to provide records for new users of a collaboration environment, in accordance with one or more implementations.

FIG. 2 illustrates a method 200 to provide records for new users of a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining the collaboration environment. The collaboration environment may be configured to facilitate interaction by users with the collaboration environment. The environment state information may include one or more records. The records may include one or more of user information describing the users of the collaboration environment, work unit information describing units of work managed, created, and/or assigned within the collaboration environment, and/or other information. Operation 202 may be performed by one or more hardware processors configured by machine-readable instructions including a component that is the same as or similar to environment state component 108, in accordance with one or more implementations.

An operation 204 may obtain requests to onboard new users to the collaboration environment. The new users may be onboarded by configuring the collaboration environment based on answers to questions posed individual prompts. By way of non-limiting illustration, the requests may include a first request to onboard a first new user and/or other requests. Operation 204 may be performed by one or more hardware processors configured by machine-readable instructions including a component that is the same as or similar to onboarding component 112, in accordance with one or more implementations.

An operation 206 may obtain subsets of prompts from a set of available prompts. Obtaining the subsets of prompts may be performed in response to obtaining the requests. Individual ones of the subsets of prompts may correspond to individual roles attributed to the individual ones of the new users. By way of non-limiting illustration, a first subset of prompts may be obtained from the set of available prompts for the first new user based on a first role attributed to the first user. Operation 206 may be performed by one or more hardware processors configured by machine-readable instructions including a component that is the same as or similar to onboarding component 112, in accordance with one or more implementations.

An operation 208 may effectuate presentation of a user interface of the collaboration environment on computing platforms associated with the new users. The user interface may include the subsets of prompts obtained based on the attributed roles, and/or other information. The new users may provide entry and/or selection of individual answers to the individual prompts in the subsets of prompts within the user interface. By way of non-limiting illustration, the user interface including the first subset of prompts may be presented on a first computing platform associated with the first new user. Operation 208 may be performed by one or more hardware processors configured by machine-readable instructions including a component that is the same as or similar to user interface component 110, in accordance with one or more implementations.

An operation 210 may obtain response information conveying the entry and/or selection of the answers to the individual prompts by the new users. By way of non-limiting illustration, the response information may include first response information conveying a first set of user entry and/or selection within the user interface at the first computing platform, and/or other information. The first set of user entry and/or selection may convey a first set of answers to the questions posed in the first subset of prompts present to the first new user. Operation 210 may be performed by one or more hardware processors configured by machine-readable instructions including a component that is the same as or similar to onboarding component 112, in accordance with one or more implementations.

An operation 212 may provide one or more records for the new users based on the response information and/or other information. The one or more of the records provided for the new users may include user information, work unit information, and/or other information that is adapted based on the response information and/or other information. By way of non-limiting illustration, a first record may be provided to the first new user based on the first response information and/or other information. The first record may be provided such that first user information, first work unit information, and/or other information in the first record is adapted based on the first response information and/or other information. Operation 212 may be performed by one or more hardware processors configured by machine-readable instructions including a component that is the same as or similar to onboarding component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to provide records for new users of a collaboration environment, the system comprising:
   non-transitory electronic storage storing onboarding information, the onboarding information including a set of available role-specific prompts posing questions related to the collaboration environment; and
   one or more physical processors configured by machine-readable instructions to:
      manage environment state information maintaining the collaboration environment, the collaboration environment being configured to facilitate interaction by users with the collaboration environment, the environment state information including the records, the records including user information describing the users of the collaboration environment, and/or work unit information describing units of work managed, created, and/or assigned within the collaboration environment;
      obtain requests to onboard the new users to the collaboration environment, the new users being onboarded by configuring the collaboration environment for individual ones of the new users based on answers to the questions posed in individual role-specific prompts, the requests including a first request to onboard a first new user;
      in response to obtaining the requests; attribute individual roles to the individual ones of the new users and obtain subsets of role-specific prompts from the set of available role-specific prompts, individual ones of the subsets of role-specific prompts corresponding to the individual roles attributed to the individual ones of the new users, such that a first role is attributed to the first new user and a first subset of role-specific prompts from the set of available role-specific prompts is obtained for the first new user based on the first role attributed to the first new user;
      effectuate presentation of instances of a graphical user interface on computing platforms associated with the new users, the instances of the graphical user interface presenting sets of user interface elements corresponding to the subsets of role-specific prompts, wherein the new users interact with the sets of user interface elements by providing entry and/or selection of individual answers to the individual role-specific prompts within the sets of user interface elements, such that a first instance of the graphical user interface including the first subset of role-specific prompts is presented on a first computing platform associated with the first new user;
      obtain response information conveying the entry and/or selection of the individual answers to the individual role-specific prompts within the sets of user interface elements, the response information including first response information conveying a first set of user entry and/or selection within the first instance of the graphical user interface at the first computing platform, the first set of user entry and/or selection conveying a first set of answers to the questions posed in the first subset of role-specific prompts;
      provide one or more of the records for the new users based on the response information, such that the one or more of the records provided for the new users includes the user information and/or the work unit information that is adapted based on the response information, such that a first record is provided for the first new user based on the first response information such that first user information and/or first work unit information in the first record is adapted based on the first response information; and
      cause the instances of the graphical user interface presenting the sets of user interface elements corresponding to the subsets of role-specific prompts to navigate to views of the collaboration environment through which the one or more of the records are made accessible, such that the first instance of the graphical user interface presented at the first computing platform navigates to a first view of the collaboration environment through which the first record is made accessible.

2. The system of claim 1, wherein providing the one or more of the records includes creating individual new records and/or modifying individual existing records.

3. The system of claim 2, wherein providing the first record includes creating the first record.

4. The system of claim 2, wherein providing the first record includes modifying the first record, such that the one or more physical processors are further configured by the machine-readable instructions to:
   modify the first record based on the first response information.

5. The system of claim 2, wherein modifications to the individual existing records includes one or more assigning the individual existing records to the individual ones of the new users, adding the individual ones of the new users as collaborators on the individual existing records, or adding the individual ones of the new users as reviewers of the individual existing records.

6. The system of claim 1, wherein the one or more physical processors are further configured by the machine-readable instructions to:
in response to obtaining the requests, obtain channel information for the new users characterizing source of the requests, such that in response to obtaining the first request, obtain first channel information characterizing a first source of the first request; and
determine the individual roles attributed to the individual ones of the new users from the channel information, such that the first role attributed to the first new user is determined from the first channel information.

7. The system of claim 6, wherein source includes one or more of an online platform different from the collaboration environment, specific advertisement content, or an electronic communication.

8. The system of claim 1, wherein the one or more physical processors are further configured by the machine-readable instructions to:
modify, based on the response information, the individual roles attributed to the new users; and
modify, in response to modification of the individual roles, one or more role-specific prompts in the subsets of role-specific prompts obtained in response to the requests.

9. The system of claim 1, wherein the user information includes values of user parameters, and the work unit information includes value of work unit parameters, and wherein adapting the user information and/or the work unit information based on the response information comprises varying the values of the user parameters and/or work unit parameters based on the individual answers.

10. The system of claim 1, wherein the questions related to the collaboration environment are directed to how the new users perform work and/or prioritize work.

11. A method to provide records for new users of a collaboration environment, the method comprising:
obtaining onboarding information, the onboarding information including a set of available role-specific prompts posing questions related to the collaboration environment;
managing environment state information maintaining the collaboration environment, the collaboration environment being configured to facilitate interaction by users with the collaboration environment, the environment state information including the records, the records including user information describing the users of the collaboration environment, and/or work unit information describing units of work managed, created, and/or assigned within the collaboration environment;
obtaining requests to onboard the new users to the collaboration environment, the new users being onboarded by configuring the collaboration environment for individual ones of the new users based on answers to the questions posed in individual role-specific prompts, the requests including a first request to onboard a first new user;
in response to obtaining the requests, attributing individual roles to the individual ones of the new users and obtaining subsets of role-specific prompts from the set of available role-specific prompts, individual ones of the subsets of role-specific prompts corresponding to the individual roles attributed to the individual ones of the new users, including attributing a first role the first new user and obtaining a first subset of role-specific prompts from the set of available role-specific prompts for the first new user based on the first role attributed to the first new user;
effectuating presentation of instances of a graphical user interface on computing platforms associated with the new users, the instances of the graphical user interface presenting sets of user interface elements corresponding to the subsets of role-specific prompts, wherein the new users interact with the sets of user interface elements by providing entry and/or selection of individual answers to the individual role-specific prompts within the sets of user interface elements, including presenting a first instance of the graphical user interface on a first computing platform associated with the first new user, the first instance of the graphical user interface displaying the first subset of role-specific prompts;
obtaining response information conveying the entry and/or selection of the individual answers to the individual role-specific prompts within the sets of user interface elements, the response information including first response information conveying a first set of user entry and/or selection within the first instance of the graphical user interface at the first computing platform, the first set of user entry and/or selection conveying a first set of answers to the questions posed in the first subset of role-specific prompts;
providing one or more of the records for the new users based on the response information, such that the one or more of the records provided for the new users includes the user information and/or the work unit information that is adapted based on the response information, including providing a first record for the first new user based on the first response information such that first user information and/or first work unit information in the first record is adapted based on the first response information; and
causing the instances of the graphical user interface presenting the sets of user interface elements corresponding to the subsets of role-specific prompts to navigate to views of the collaboration environment through which the one or more of the records are made accessible, including causing the first instance of the graphical user interface presented at the first computing platform to navigate to a first view of the collaboration environment through which the first record is made accessible.

12. The method of claim 11, wherein the providing the one or more of the records includes creating individual new records and/or modifying individual existing records.

13. The method of claim 12, wherein the providing the first record includes creating the first record.

14. The method of claim 12, wherein the providing the first record includes modifying the first record, and the method further comprises:
modifying the first record based on the first response information.

15. The method of claim 12, wherein modifications to the individual existing records includes one or more assigning the individual existing records to the individual ones of the new users, adding the individual ones of the new users as collaborators on the individual existing records, or adding the individual ones of the new users as reviewers of the individual existing records.

16. The method of claim 11, further comprising:
in response to obtaining the requests, obtaining channel information for the new users characterizing source of the requests, including in response to obtaining the first request, obtaining first channel information characterizing a first source of the first request; and
determining the individual roles attributed to the individual ones of the new users from the channel information, including determining the first role attributed to the first new user from the first channel information.

17. The method of claim 16, wherein source includes one or more of an online platform different from the collaboration environment, specific advertisement content, or an electronic communication.

18. The method of claim 11, further comprising:
modifying, based on the response information, the individual roles attributed to the new users; and
modifying, in response to modification of the individual roles, one or more role-specific prompts in the subsets of role-specific prompts obtained in response to the requests.

19. The method of claim 11, wherein the user information includes values of user parameters, and the work unit information includes value of work unit parameters, and wherein adapting the user information and/or the work unit information based on the response information comprises varying the values of the user parameters and/or work unit parameters based on the individual answers.

20. The method of claim 11, wherein the questions related to the collaboration environment are directed to how the new users perform work and/or prioritize work.

* * * * *